US012220361B2

(12) United States Patent
Borden

(10) Patent No.: US 12,220,361 B2
(45) Date of Patent: Feb. 11, 2025

(54) MOBILE MEDICAL CARE SYSTEM

(71) Applicant: Aardvark Studios, LLC, Conshohocken, PA (US)

(72) Inventor: Lawrence W. Borden, Conshohocken, PA (US)

(73) Assignee: Aardvark Studios, LLC

(*) Notice: Subject to any disclaimer, the term of this patent is extended or adjusted under 35 U.S.C. 154(b) by 90 days.

(21) Appl. No.: 17/383,360

(22) Filed: Jul. 22, 2021

(65) Prior Publication Data

US 2022/0023118 A1 Jan. 27, 2022

Related U.S. Application Data

(60) Provisional application No. 63/106,682, filed on Oct. 28, 2020, provisional application No. 63/055,668, filed on Jul. 23, 2020.

(51) Int. Cl.

*A61G 3/00* (2006.01)
*A61G 10/00* (2006.01)

(52) U.S. Cl.

CPC ........... *A61G 3/001* (2013.01); *A61G 10/005* (2013.01)

(58) Field of Classification Search

CPC ........ A61G 3/001; A61G 10/005; E04H 3/08; E04H 1/02; A61B 10/0051

See application file for complete search history.

(56) References Cited

U.S. PATENT DOCUMENTS

| | | | |
|---|---|---|---|
| 2,733,094 A | | 1/1956 | Carlton |
| 3,258,019 A | | 6/1966 | Bellas et al. |
| 3,308,845 A | | 3/1967 | Bellas |
| 3,338,423 A | | 8/1967 | Wellman, Jr. |
| 3,492,042 A | | 1/1970 | Nachtigall, Jr. |
| 3,534,997 A | | 10/1970 | Mitchell, Jr. |
| 3,620,564 A | | 11/1971 | Wenger et al. |
| 3,670,718 A | * | 6/1972 | Brendgord ............. A61B 90/00 976/DIG. 336 |

(Continued)

FOREIGN PATENT DOCUMENTS

| | | | | |
|---|---|---|---|---|
| CA | 2369334 A1 | * | 8/2002 | ............. A45C 13/12 |
| CN | 201824993 U | * | 5/2011 | |

(Continued)

OTHER PUBLICATIONS https://www.aardvarkmobiletours.com/look-book/#! Retrieved Nov. 28, 2017, 1 pg.

(Continued)

*Primary Examiner* — Lori Lyjak

(74) *Attorney, Agent, or Firm* — BLANK ROME LLP

(57) ABSTRACT

A medical care system having one or more clinician rooms, and one or more patient areas. The clinician rooms and patient areas are separate from one another to prevent an infectious virus (such as COVID-19) from spreading from one room or area to another room or area. A dividing wall is provided between each clinician room and the respective patient area. A glass partition is located in the dividing wall and one or more gloves are provided in the glass partition. Thus, a clinician located in a clinician room can interact with a patient located in the patient area to conduct a physical medical examination, such as for example to take the temperature of the patient or test for a virus.

20 Claims, 11 Drawing Sheets

(56) References Cited

U.S. PATENT DOCUMENTS

| | | | | |
|---|---|---|---|---|
| D230,351 | S | 2/1974 | Hamel | |
| 3,802,103 | A | 4/1974 | Neff | |
| 4,019,773 | A | 4/1977 | Vehling | |
| D246,360 | S | 11/1977 | Hafer | |
| D247,290 | S | 2/1978 | Arnot, Jr. et al. | |
| 4,232,488 | A | 11/1980 | Hanley | |
| 4,270,319 | A | 6/1981 | Spasojevic | |
| 4,601,509 | A | 7/1986 | Ellis, Sr. | |
| 4,639,031 | A * | 1/1987 | Truckenbrodt | B60P 3/205 160/84.01 |
| D292,196 | S | 10/1987 | Dooley | |
| D300,012 | S | 2/1989 | Boice, Jr. | |
| 4,958,874 | A | 9/1990 | Hegedus | |
| D314,164 | S | 1/1991 | Barber | |
| 5,310,209 | A | 5/1994 | Holman | |
| 5,375,899 | A | 12/1994 | Wright | |
| 5,383,703 | A | 1/1995 | Irvine, III | |
| D371,330 | S | 7/1996 | Wright | |
| D371,527 | S | 7/1996 | Wright | |
| 5,706,616 | A | 1/1998 | Fernandez | |
| D400,124 | S | 10/1998 | Mason et al. | |
| 5,833,293 | A | 11/1998 | Ludwig | |
| 5,833,294 | A | 11/1998 | Williams et al. | |
| 5,918,924 | A | 7/1999 | Cowan | |
| D413,838 | S | 9/1999 | McDaniel | |
| D426,493 | S | 6/2000 | Mertins et al. | |
| 6,182,795 | B1 | 2/2001 | Boerer | |
| 6,189,244 | B1 | 2/2001 | Johnson | |
| 6,585,305 | B2 | 7/2003 | Nazginov et al. | |
| 6,686,305 | B1 | 2/2004 | Beall | |
| D491,844 | S | 6/2004 | Poulin | |
| 6,997,495 | B1 | 2/2006 | Groezinger | |
| D533,115 | S | 12/2006 | Delamour | |
| 7,198,313 | B2 | 4/2007 | Baum | |
| D551,128 | S | 9/2007 | Renard | |
| 7,287,349 | B1 | 10/2007 | MacDonald et al. | |
| 7,364,050 | B2 | 4/2008 | Guard | |
| 7,621,576 | B2 | 11/2009 | Cote | |
| 7,942,461 | B2 | 5/2011 | Cohen | |
| 7,950,728 | B2 | 5/2011 | Plavetich | |
| D650,310 | S | 12/2011 | Varotsos | |
| D652,353 | S | 1/2012 | Cohen | |
| D653,993 | S | 2/2012 | Cohen | |
| 8,141,304 | B2 | 3/2012 | Shen | |
| D656,866 | S | 4/2012 | Wise | |
| 8,220,854 | B2 | 7/2012 | Cohen | |
| D678,823 | S | 3/2013 | Cohen | |
| 8,387,856 | B1 * | 3/2013 | Lachance | B65D 5/6655 206/757 |
| 8,485,285 | B2 | 7/2013 | Ferrigni | |
| 8,506,301 | B2 | 8/2013 | Jaszlics et al. | |
| 8,636,208 | B2 | 1/2014 | Urban | |
| D701,470 | S | 3/2014 | Cohen | |
| D701,471 | S | 3/2014 | Cohen | |
| 8,690,215 | B2 | 4/2014 | Cohen | |
| 8,955,897 | B1 | 2/2015 | Miller | |
| D736,675 | S | 8/2015 | Cohen et al. | |
| 9,458,621 | B2 | 10/2016 | Calafatis et al. | |
| 9,469,236 | B2 | 10/2016 | Nicholson | |
| 9,481,283 | B2 | 11/2016 | Cohen | |
| 9,520,012 | B2 | 12/2016 | Stiernagle | |
| D782,938 | S | 4/2017 | Cohen et al. | |
| 9,700,761 | B2 | 7/2017 | Beaver et al. | |
| 9,750,999 | B2 | 9/2017 | Monaco | |
| D809,430 | S | 2/2018 | Orlovich | |
| 9,896,017 | B1 | 2/2018 | Requejo | |
| 9,898,017 | B2 | 2/2018 | Graves | |
| D832,138 | S | 10/2018 | Cavalieri D'Oro | |
| 10,160,370 | B2 | 12/2018 | Borden | |
| 10,269,273 | B1 | 4/2019 | Borden | |
| D847,695 | S | 5/2019 | Borden | |
| 10,339,514 | B2 | 7/2019 | Natarajan | |
| 10,874,117 | B2 | 12/2020 | Tollefson | |
| 10,926,687 | B2 | 2/2021 | Tadros | |
| 10,980,247 | B2 | 4/2021 | Tollefson | |
| 11,014,484 | B1 | 5/2021 | Borden | |
| D926,084 | S | 7/2021 | Borden | |
| 11,352,079 | B1 | 6/2022 | Cash | |
| 11,707,160 | B2 | 7/2023 | Klein | |
| D1,008,093 | S | 12/2023 | Walöen et al. | |
| D1,009,710 | S | 1/2024 | Elsner | |
| D1,009,712 | S | 1/2024 | Kamdron | |
| D1,010,514 | S | 1/2024 | Elsner | |
| D1,010,515 | S | 1/2024 | Leishman | |
| D1,015,205 | S | 2/2024 | Stanners | |
| D1,024,850 | S | 4/2024 | Borden | |
| D1,024,888 | S | 4/2024 | Belcher | |
| D1,025,836 | S | 5/2024 | Borden | |
| D1,028,794 | S | 5/2024 | Wang | |
| D1,029,691 | S | 6/2024 | Wisler | |
| D1,030,558 | S | 6/2024 | Jin | |
| D1,035,491 | S | 7/2024 | Lee | |
| 2002/0153747 | A1 | 10/2002 | Ropp | |
| 2003/0038494 | A1 | 2/2003 | Nazginov | |
| 2004/0256872 | A1 | 12/2004 | Piper | |
| 2006/0248763 | A1 | 11/2006 | Tarabella | |
| 2007/0156005 | A1 * | 7/2007 | Baum | B08B 15/02 588/249 |
| 2007/0290587 | A1 * | 12/2007 | Jeansonne | A47B 67/04 312/311 |
| 2008/0030427 | A1 | 2/2008 | Lanham | |
| 2009/0019747 | A1 | 1/2009 | Rosa | |
| 2009/0066106 | A1 | 3/2009 | Liu | |
| 2009/0195008 | A1 | 8/2009 | Braswell | |
| 2010/0036707 | A1 | 2/2010 | Gilchrist | |
| 2010/0043264 | A1 | 2/2010 | Johnson, Jr. | |
| 2010/0269419 | A1 | 10/2010 | Gyory | |
| 2011/0313811 | A1 | 12/2011 | Urban et al. | |
| 2012/0255240 | A1 | 10/2012 | Shen | |
| 2012/0303458 | A1 | 11/2012 | Schuler, Jr. | |
| 2014/0157685 | A1 | 6/2014 | Fagan | |
| 2015/0315776 | A1 | 11/2015 | Duncan | |
| 2016/0128886 | A1 * | 5/2016 | Merino | E04H 1/1277 600/21 |
| 2016/0159267 | A1 | 6/2016 | Dixon | |
| 2017/0096091 | A1 | 4/2017 | Johnson | |
| 2017/0158108 | A1 | 6/2017 | Elbaz | |
| 2017/0232880 | A1 | 8/2017 | Peterson et al. | |
| 2018/0020823 | A1 * | 1/2018 | Holmes | A61B 5/15142 600/573 |
| 2018/0186272 | A1 | 7/2018 | Borden | |
| 2018/0272825 | A1 | 9/2018 | Eagleton | |
| 2019/0251883 | A1 | 8/2019 | Borden | |
| 2020/0086805 | A1 | 3/2020 | Strasser, Jr. | |
| 2021/0276476 | A1 | 9/2021 | Borden | |
| 2022/0396193 | A1 | 12/2022 | Gallery | |
| 2023/0150415 | A1 | 5/2023 | Aaron | |

FOREIGN PATENT DOCUMENTS

| | | | | |
|---|---|---|---|---|
| CN | 210947910 | | 7/2020 | |
| CN | 111593909 | A * | 8/2020 | A61G 10/005 |
| DE | 3446490 | A1 | 9/1985 | |
| DE | 19541655 | A1 | 5/1996 | |
| DE | 202016102009 | U1 | 6/2016 | |
| EM | 0020150240001 | | 4/2012 | |
| EP | 0009945 | A1 | 4/1980 | |
| EP | 0070563 | A1 | 1/1983 | |
| EP | 1234519 | A2 * | 8/2002 | A45C 13/12 |
| EP | 1635312 | A1 | 3/2006 | |
| EP | 2446870 | A2 * | 5/2012 | A61G 3/001 |
| EP | 3520759 | A1 * | 8/2019 | C12Q 1/001 |
| FR | 766934 | A | 7/1934 | |
| FR | 917441 | A | 1/1947 | |
| FR | 2904138 | A1 | 1/2008 | |
| GB | 652823 | A | 5/1951 | |
| GB | 2097341 | A | 11/1982 | |
| JP | 690100097 | B1 * | 7/2021 | A45C 13/12 |
| KR | 200439760 | Y1 | 5/2008 | |
| KR | 20160011517 | | 2/2016 | |
| KR | 1020160115172 | A | 10/2016 | |
| KR | 102161495 | B1 * | 5/2020 | |
| WO | 2011105094 | A1 | 9/2011 | |

(56) References Cited

FOREIGN PATENT DOCUMENTS

| | | | | | | |
|---|---|---|---|---|---|---|
| WO | 2011160167 | A1 | | 12/2011 | | |
| WO | WO-2011158736 | A1 | * | 12/2011 | ............. | C12Q 1/001 |
| WO | WO-2013078162 | A1 | * | 5/2013 | ............. | A61G 10/00 |

OTHER PUBLICATIONS https://www.facebook.com/mobiletours/photos/a.135812687238.109513.29817547238/10155116314087239/?type=3&theater Posted Oct. 23, 2017, 1 pg.

https://www.streamcompanies.com/portfolio-piece/aardvark-event-logistics/ Available Jan. 2017, 1 pg.

https://twitter.com/brian_rebello Posted Sep. 14, 2016, 1 pg.

Aardvark Event Logistics. "Look Book" Custom Marketing Vehicle Look Book. Nov. 13, 2017. https://aardvarkmobiletours.com/look-book. 5 pages.

The Aardy—100% Electric Promo Sampling Vehicle. Nov. 9, 2017. Download from Facebook. 19 pages.

"To the Bookmobile! The Library on Wheels of Yesteryear." Oct. 8, 2013 printed Sep. 13, 2017. http://www.messynessychic.com/2013/10/08/to-the-bookmobile-the-library-on-wheels-of-yesteryear/ 14 pages.

Aardvark Mobile Tours Home Facebook https://www.facebook.com/mobiletours/photos/a.135812687238/10155435076532239/?type=3&theater Feb. 22, 2018 (Year: 2018).

Aardy Vehicle by Aardvark Event Logistics, All Above campaign, 2 pages, 2014.

Aardy Vehicle by Aardvark Event Logistics, Bare Escentuais campaign, 3 pages, 2010.

Aardy Vehicle by Aardvark Event Logistics, BlackBerry campaign, 2 pages, 2011.

Aardy Vehicle by Aardvark Event Logistics, Cellular South campaign, 1 page, 2009.

Aardy Vehicle by Aardvark Event Logistics, Disney campaign, 1 page, 2011.

Aardy Vehicle by Aardvark Event Logistics, Glade campaign, 4 pages, 2012.

Aardy Vehicle by Aardvark Event Logistics, Samsung campaign, 2 pages, 2016.

Aardy Vehicle by Aardvark Event Logistics, Subway campaign, 2 pages, 2012.

Aardy Vehicle by Aardvark Event Logistics, Verizon campaign, 3 pages, 2014.

Conshohocken, Published Jun. 4, 2020 [online], [retrieved on Jan. 20, 2023]. Retrieved from the Internet: https://www.bizjournals.com/philadelphia/news/2020/06/04/aardvark-mobile-health-conshohocken-covid-19.html (Year: 2020).

Machine Translation of KR10-2016-0115172, Jun. 14, 2017, http://engpat.kipris.or.kr/pmt/patent/patentRTT.jsp.

Roughneck mobile showroom—Two Point Zero https://news.cision.com/two-point-zero/i/roughneck-mobile-showroom,c1534112 Posted Aug. 21, 2014 (Year: 2014).

T Aardy Vehicle by Aardvark Event Logistics, T-Mobile campaign, 4 pages, 2015.

Wren Kitchens on X Our mobile showroom is getting comfy https://twitter.com/WrenKitchens/status/566179181667426304 Posted Feb. 13, 2015 (Year: 2015).

Mobile Public Toilets Bangkok. 2024. Alamy. https://www.alamy.com/mobile-public-toilets-bangkok-image65365925.htm.

Mobile Health Clinic drives care access. Feb. 24, 2022. Mayo Clinic. https://www.mayoclinichealthsystem.org/hometown-health/transforming-healthcare/mobile-health-clinic-drives-care-access.

This cute little electric truck is a mobile vaccine unit. Mar. 8, 2021. Fast Company. https://www.fastcompany.com/90611887/ this-cute-little-electric-truck-is-a-mobile-vaccine-unit.

* cited by examiner

MOBILE MEDICAL CARE SYSTEM

RELATED APPLICATIONS

This application claims the benefit of priority of U.S. Provisional Application No. 63/055,668, filed Jul. 23, 2020, and U.S. Provisional Application No. 63/106,682, filed Oct. 28, 2020. The content of those applications is relied upon and incorporated herein by reference in its entirety.

BACKGROUND

Field

The present disclosure relates to a mobile care system to administer mobile medical care. More particularly, the disclosure relates to mobile vehicles such as trucks to administer tests, exams, analysis, treatment, therapy and/or to medication to patients.

Background of the Related Art

As shown in U.S. Pat. No. 10,269,273, mobile showroom and advertising vehicles have been developed for displaying products and services.

There is currently a need to have a medical care facility to administer tests, exams, analysis, treatment, and/or to care to patients. In particular, there is a need for a medical care facility to test for viruses, such as the current COVID-19, SARS COV-2 pandemic, as well as other diseases, conditions, or illnesses.

BRIEF DESCRIPTION OF THE FIGURES

FIG. 1(*b*) is a front view of FIG. 1(*a*);

FIG. 1(*c*) is a rear view of FIG. 1(*a*);

FIG. 1(*d*) is a right-side view of FIG. 1(*a*);

FIG. 2(*b*) is a front view of FIG. 2(*a*);

FIG. 2(*c*) is a rear view of FIG. 2(*a*);

FIG. 2(*d*) is a top view of FIG. 2(*a*);

FIG. 3(*b*) is a left side view of FIG. 2(*a*);

FIG. 5(*b*) is a side view of the storage containers;

FIGS. 5(*c*)-5(*e*) are detailed views of the medical care apparatus;

FIG. 6(*b*) is a front view of the vehicle of FIG. 6(*a*);

FIG. 7(*b*) is a front view of the vehicle of FIG. 7(*a*);

FIG. 8(*a*) is a top view and. FIG. 8(*b*) is a perspective view of the mobile health vehicle in operating configuration; and.

DETAILED DESCRIPTION

Figure 1A:
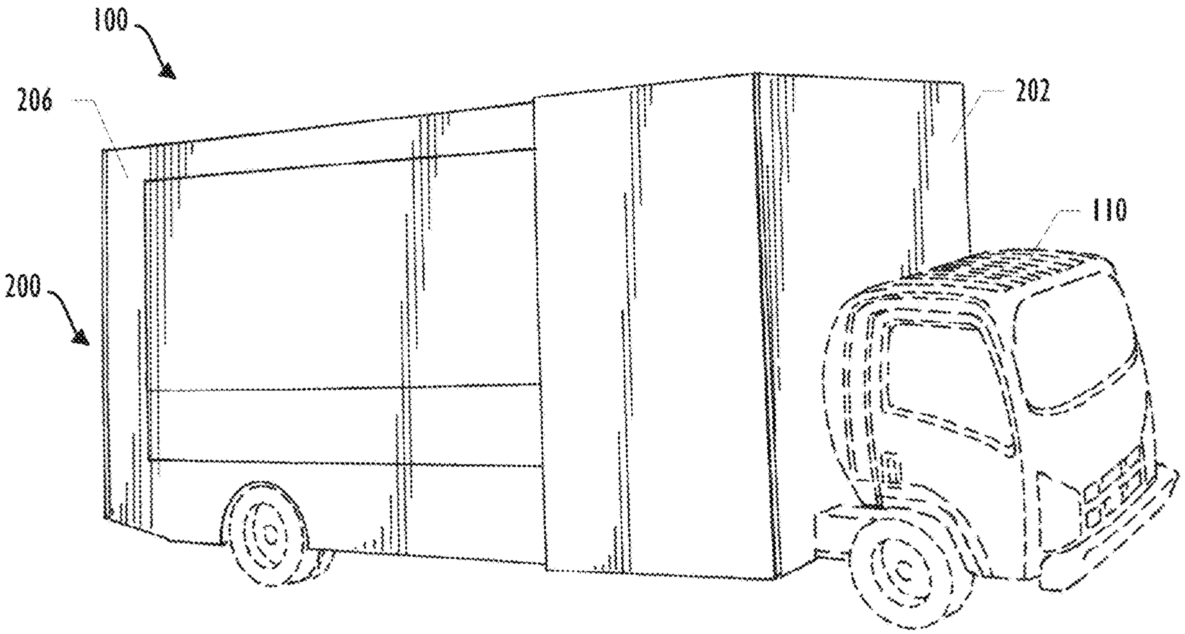
FIG. 1(*a*) is a perspective left side view of the mobile medical care system in accordance with an embodiment of the disclosure in a closed position.
Figure 1B:
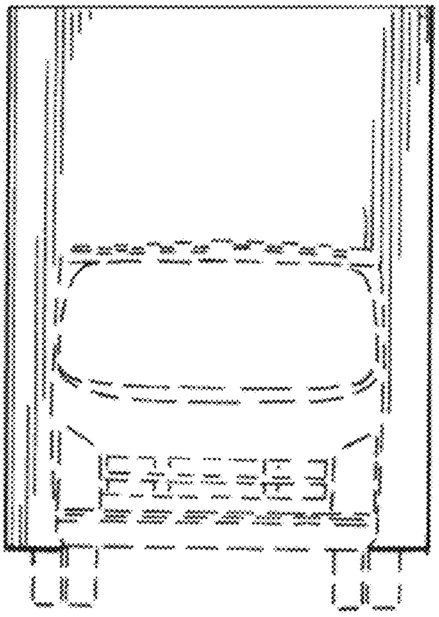
Figure 1C:
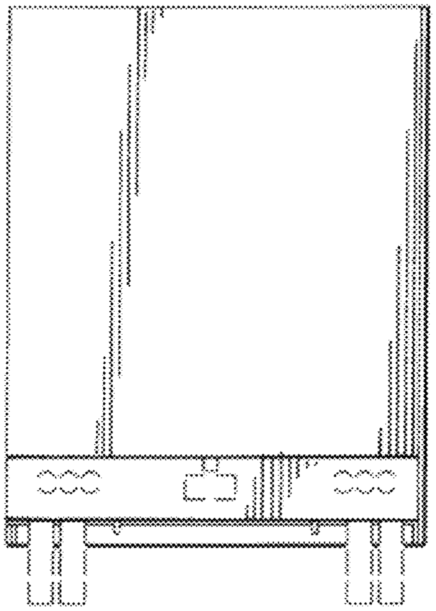
Figure 1D:
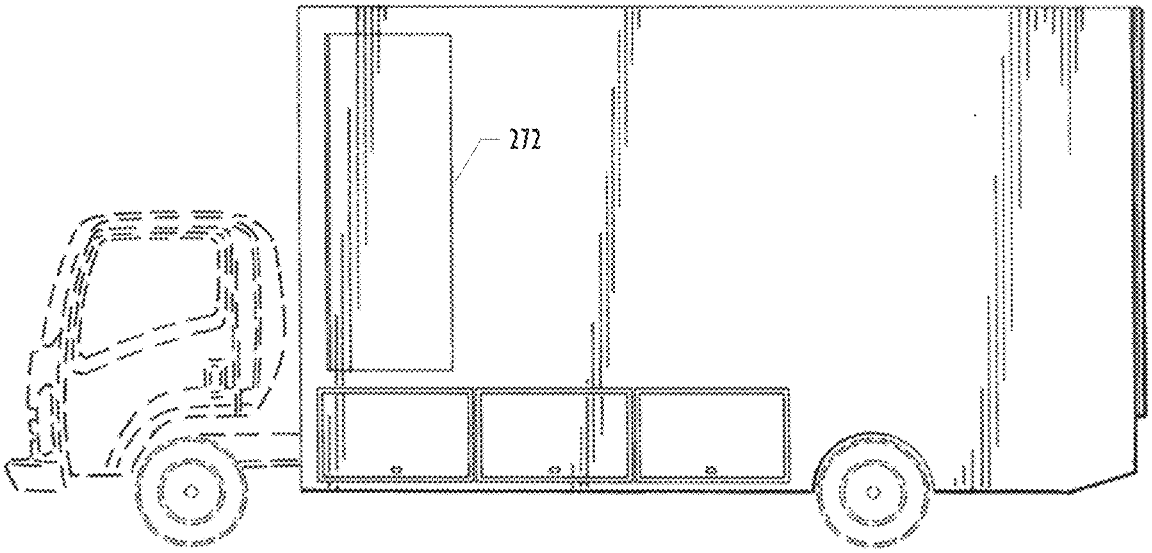
Figure 2A:
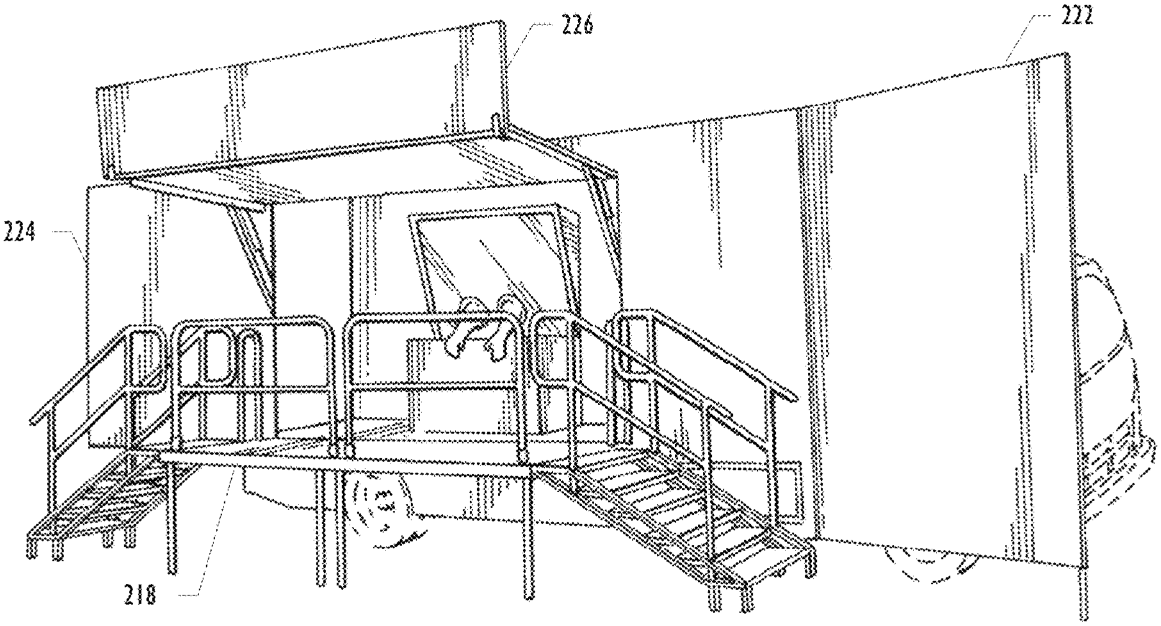
FIG. 2(*a*) is a perspective view of the mobile medical care system in an open position and showing the medical care apparatus.
Figure 2B:
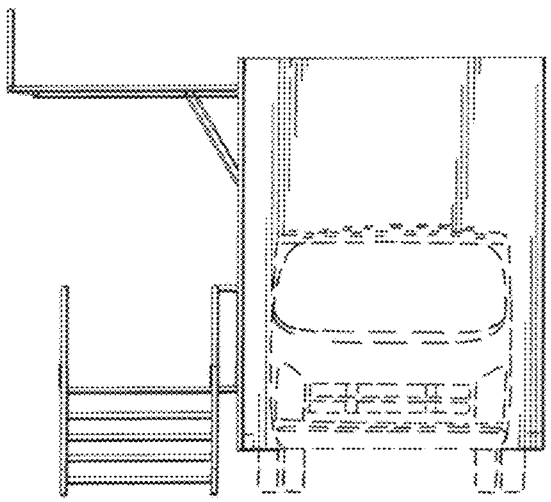
Figure 2C:
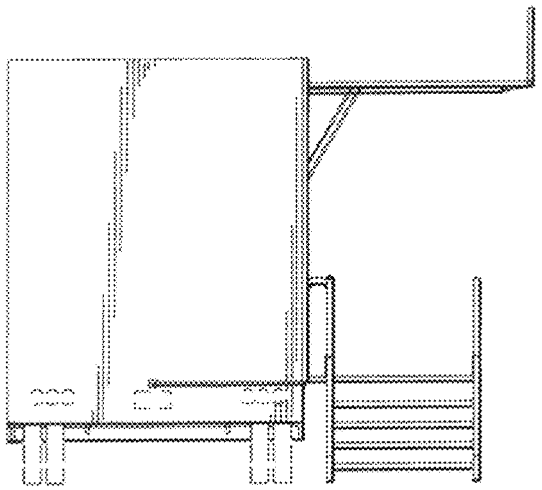
Figure 2D:
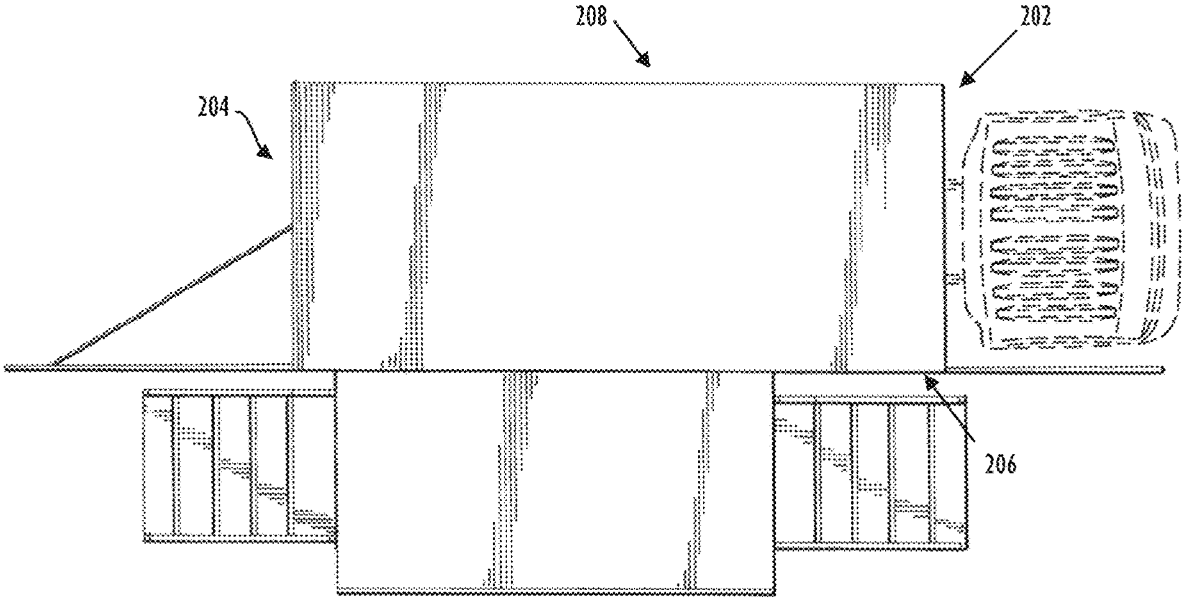

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

FIGS. 1(*a*)-(*d*), 4 show the mobile medical care system 100 of the disclosure. The medical care system 100 is shown implemented in a vehicle, and more particularly a truck having a trailer. Accordingly, the mobile medical care system 100 has a cab 110 with wheels in front and a medical care compartment 200 with wheels at the rear. By being mobile, the medical care compartment 200 can be moved from location to location to conduct testing, analysis and/or to administer medical care to patients. Thus, the system 100 can be driven to a site, set up quickly to administer tests and medical care, and then moved to a different location. However, the medical care system 100 need not be mobile and, for example, the medical care compartment 200 can be at a fixed location. The medical care system 100 can utilize any suitable mobile device. In addition, the medical care system 100 can be utilized to administer any medical care, such as for example, advice, tests, exams, analysis, treatment, therapy, and/or medication to patients As illustrated, the medical care compartment 200 has a fixed front panel 202, fixed rear panel 204, fixed right side (passenger side) panel 206, and fixed left side (driver side) panel 208. In the embodiment of FIGS. 1(*a*)-(*d*), the medical care compartment 200 also has a front billboard 222 at the front of the compartment 200 that swings open forward, a rear billboard 224 that swings forward open from the rear of the compartment 200, and a side panel 226 that swings open and upward to form a cover or awning that can display information (text or logos), such as shown in U.S. Pat. No. 10,269,273, the entire contents of which are hereby incorporated by reference. It is noted, however, that the medical care system 100 need not have a front billboard, rear billboard and/or side panel that opens and closes.

FIGS. 2(*a*)-(*d*), 3(*a*)-(*b*) show the medical care system 100 in an open configuration. The front billboard swings forward over the cab 110 and has a locking mechanism to lock the front billboard in each of the opened and closed positions. The rear billboard swings outward from the rear panel of the medical care compartment 200 and has a locking mechanism such as a swing arm or support rod/pole, that locks the rear billboard in the opened and closed positions. The moving side panel is formed in the right-side fixed panel and moves upward and has a locking mechanism that locks the moving side panel in the opened and closed positions.

Figure 3A:
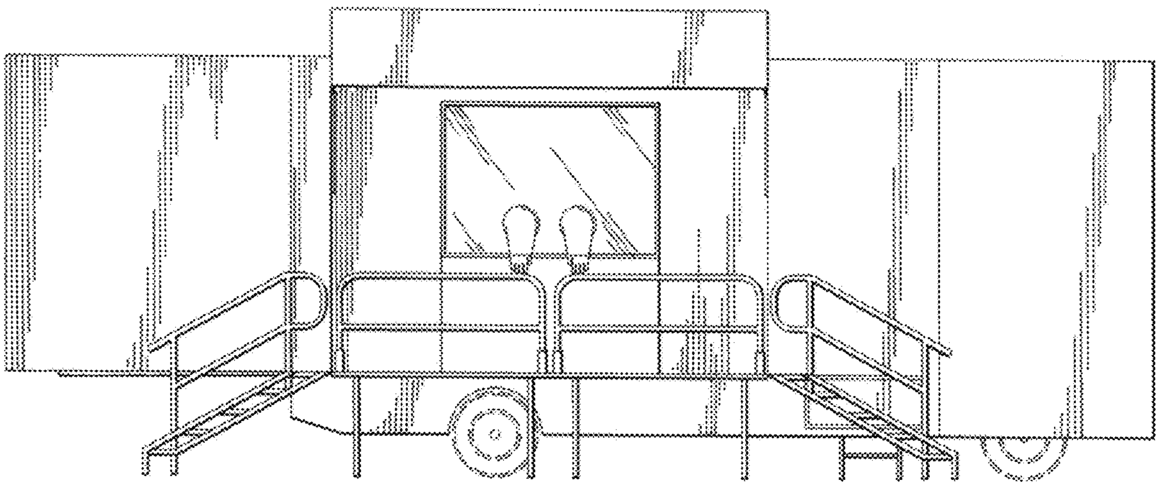
FIG. 3(*a*) is a right-side view of FIG. 2(*a*)
Figure 3B:
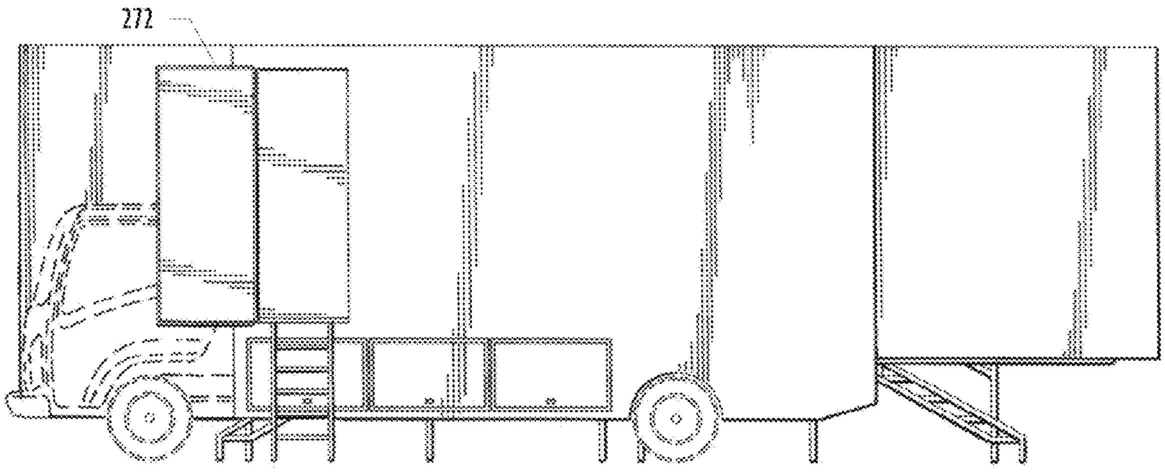

FIGS. 3(*a*), 4 show the medical care compartment 200 in greater detail. Here, the medical care compartment has a clinician room 210, a patient room 250, and a storage room 270. The clinician room 210 has a rectangular or cuboid shape with four walls, ceiling and floor, and is for a clinician that administers the medical care, such a nurse, physician or other medical professional or administrator. The patient room 250 has a rectangular or cuboid shape with four walls, ceiling and floor, and is for the patient that receives the medical care The storage room 270 has a rectangular or cuboid shape and has four side walls, ceiling and floor, and is for supplies. Each room 210, 250, 270 is completely separate from each other.

A first dividing wall, referred to here as the storage dividing wall 212, separates the storage room 270 from the clinician room 210 and the patient room 250. An internal door is provided at the storage dividing wall 212 between the clinician room 210 and the storage room 270 to allow the clinician to enter and exit the clinician room 210. An external door 272 is located at the left side of the compartment 200 to permit the clinician to enter and exit the compartment 200. Alternatively, an external door can be placed at the clinician room so that the clinician can enter and exit the vehicle without having to go through the storage room, and/or the internal door need not be provided at the storage dividing wall 212 between the clinician room 210 and the storage room 270.

A second dividing wall, referred to here as the clinician dividing wall 214, separates the clinician room 210 and the patient room 250 and extends the full length of the patient room 250 and the clinician room 210, from the storage room 270 to the rear panel wall of the compartment 200, and from the floor of the compartment 200 to the ceiling of the compartment 200.

In one embodiment, the front panel 202, rear panel 204, right panel 206 and left panel 208 of the compartment 200 define an interior space that includes the medical care compartment 200, the patient room 250, and the storage room 270. The first and second dividing walls 212, 214 are interior walls located within the interior space of the compartment 200. Accordingly, the left panel 208 of the compartment 200 forms the left side of the clinician room 210 and the left side of the storage room 270. The rear panel 204 of the compartment 200 forms the rear side of the clinician room 210 and the rear side of the patient room 250. And, the front panel 202 of the compartment 200 forms the front side of the storage room 270. The storage dividing wall 212 forms the front side of the clinician room 210 and the front side of the patient room 250. Thus, the clinician dividing wall 214 is set back away from the right panel 206 of the vehicle, and the storage dividing wall 212 is set back away from the front panel 202 of the compartment 200.

A medical care apparatus 300 is provided at the clinician dividing wall 214. The medical care apparatus 300 can include a glass partition 302 that forms a portion of the dividing wall 214. That is, the dividing wall 214 has an opening that receives the glass partition 302. The glass partition 302 enables the clinician in the clinician room 210 and the patient in the patient room 250 to visually see each other. A microphone and speaker can be positioned on each side of the glass partition 302 or dividing wall 214 so that the clinician in the clinician room 210 and the patient in the patient room 250 can speak to and hear each other.

The medical care apparatus 300 also includes a patient interaction device 304, here shown as a glove box having a port entry fitted with medical gloves. The clinician in the clinician room 210 can insert his/her hands into the medical gloves 304. The gloves 304 extend into the patient room 250 so that the clinician can touch and interact with the patient located in the patient room 250. Thus, the clinician is completely separate from the patient, so that no viruses, diseases, conditions or illnesses can be transferred between the clinician and the patient. That is, there is no gaseous, liquid or solid communication between the clinician room 210 and the patient room 250, so that the clinician and patient cannot transfer, for example, viruses by air, liquid or touch, such as the COVID-19 virus.

Figure 4:
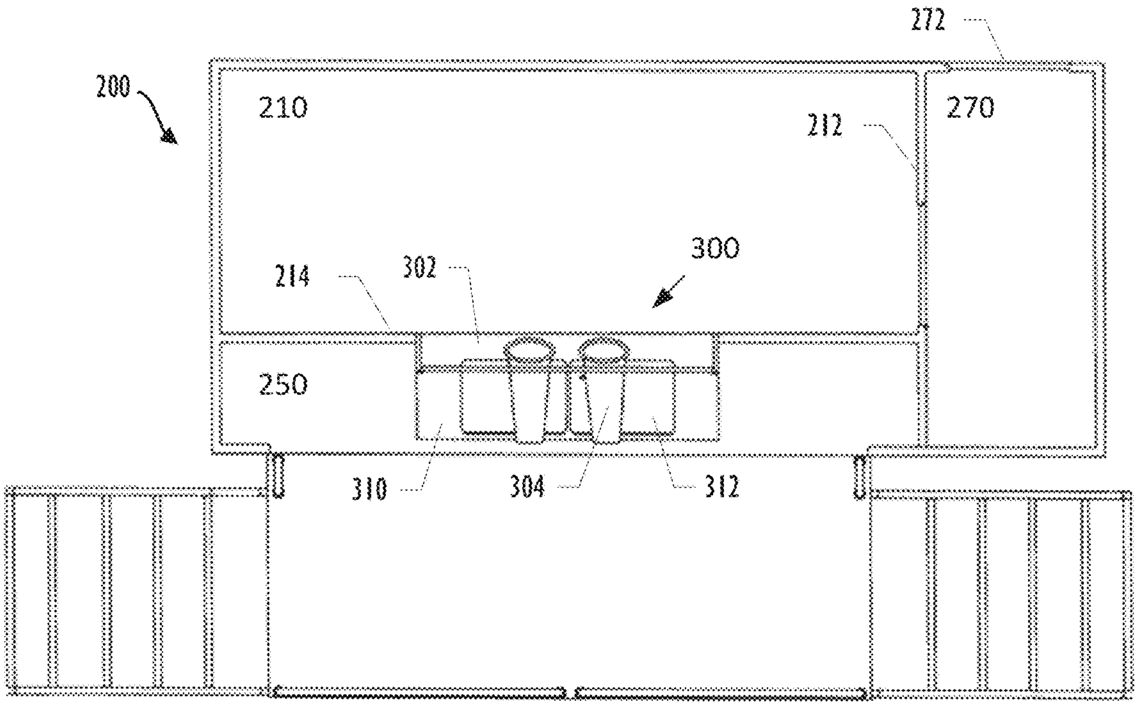
FIG. 4 is a floor plan of the mobile medical care system.
Figure 5A:
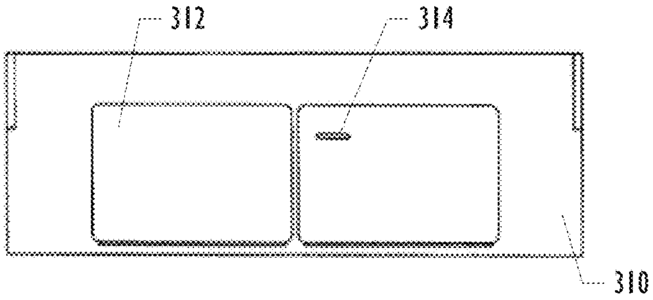
FIG. 5(*a*) is a top view of the storage containers.
Figure 5B:
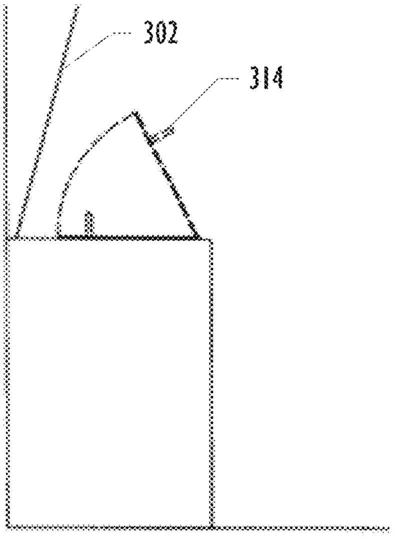
Figure 5C:
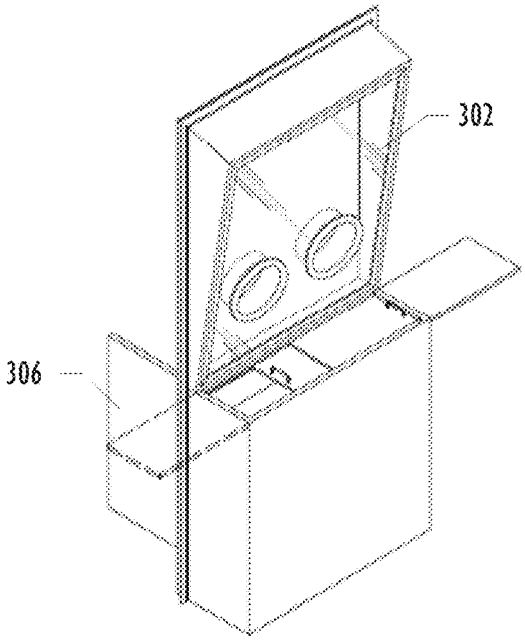
Figure 5D:
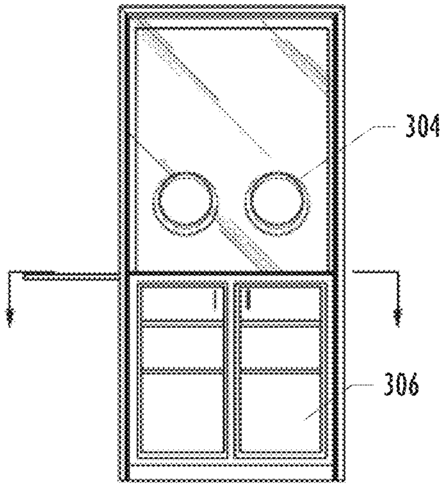
Figure 5E:
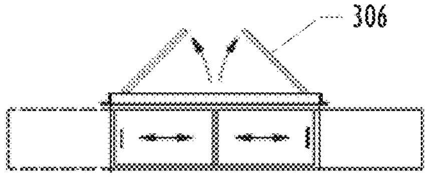

As best shown in FIGS. 4, 5(*a*), 5(*b*), the medical care apparatus 300 also includes a medical storage unit 310 located in the patient room 250. The medical storage unit 310 can contain all supplies needed by the clinician to render medical care to the patient. For example, the storage unit 310 can have thermometers or thermometer covers and other testing devices to enable the clinician to measure or test the patient's temperature. Other medical supplies can include, for example, alcohol to clean medical equipment or sterilize the patient, needles, medication, masks, and the like.

One or more lids or covers 312 are positioned on the medical storage unit 310. That is, the medical storage unit 310 is a closed box with a top surface and an interior space. One or more openings are located in the top surface and the lids 312 attached by a hinge or the like to the top surface. The lids 312 can be pivoted about the hinge to be opened and closed to permit the clinician to gain access to the medical supplies inside the interior space of the storage unit 310. The hinge can be positioned at the side of the lid 312 furthest from the clinician room 210 and the glass partition 302. so that the lid 312 opens upward and outward with respect to the clinician room 210 and the glass partition 302. In another embodiment, the lid 312 can open by slidably connecting the lid 312 to the top surface of the medical storage unit 310.

A handle 314 is positioned on the side of the storage unit 310 closest to the clinician room 210 and the glass partition 302, for ease of access by the clinician. Accordingly, the clinician can grab the handle 314 and manually pivot the lid 312 open and closed about the hinge. A bar or hydraulic arm can be provided to keep the lid 312 in the opened position without inadvertently closing, so that the clinician can release the handle while accessing the interior space of the medical storage unit 310 without the lid 312 inadvertently closing. Thus, the clinician can open the lid 312 by operation of the handle 314. Once the lid 312 is in the opened position, the clinician can release the handle 314 and insert or remove supplies from the interior space of the storage unit 310. As shown, the medical storage until 310 can have two separate containers, each having its own lid 312, such as a supply container and a waste container. The supply container can be for supplies and the waste container can be for waste, such as for example used needles, plastic packaging, and testing supplies. Thus, the clinician can retrieve supplies from the supply container, test the patient, then dispose of the used equipment in the waste container.

A locking mechanism, such as an electronic lock with a keypad or controlled by an electronic key, can also be placed on the lid 312 to enable the clinician to lock the lid 312 to prevent access by the patient. In another embodiment, the lid can be remotely controlled by the clinician to open and close automatically, such as by a remote controller operating a lid motor.

Referring to FIGS. 5(*c*)-5(*e*), one or more rear access doors 306 can optionally be provided in the clinician dividing wall 214 and/or at the rear of the medical storage unit 310 below the glass partition 302. That is, the dividing wall 214 and/or medical storage unit 310 can have an opening and an access door 306 received in the opening. The door 306 can be opened and closed by the clinician in the clinician room 210 to access the interior space of the medical storage unit 310. In that manner, the clinician can replace medical supplies that are kept in the supply container of the medical storage unit 310. For example, the clinician can retrieve supplies from the storage room 270 and place them in the medical storage unit 310. The clinician can also remove waste and garbage from waste container of the medical storage unit 310. The clinician can wear disposable gloves when accessing the medical storage unit 310, whether from the clinician room 210 or by going around the vehicle to the patient room 250.

As best shown in FIG. 5(*b*), the glass partition 302 can optionally be angled slightly into the patient room 250 at the top so that the top of the glass partition 302 extends further into the patient room 250 than the bottom of the glass partition 302. This enables the clinician to better interact with the patient.

As best illustrated in FIG. 4, the storage room 270 is elongated and extends transversely at the front of the compartment 200 and extends the entire width of the compartment 200. The clinician room 210 and the patient room 250 are configured behind and orthogonally with respect to the storage room 270. The clinician room 210 is elongated and extends longitudinally along the left side of the compartment 200 (when viewed from the front of the vehicle at the cab 110), from the storage room 270 to the rear of the compartment 200. The patient room 250 is elongated and extends longitudinally along the right side of the compartment 200, from the storage room 270 to the rear of the compartment 200. The clinician room 210 is larger than the patient room 250, such that the dividing wall 214 is closer to the right-side wall of the compartment 200 than the left side wall of the compartment 200.

However, the clinician room 210, patient room 250 and storage room 270 can be configured in any suitable manner and can have any suitable size and/or shape. In addition, the storage room 270 need not be provided. And storage compartments can be located below the floor of the clinician room 210 and/or patient room 250 (FIG. 3(*b*)). In one embodiment of the disclosure, the dividing walls 212, 214 need not be provided, such that there is no storage room 270 or patient room 250, and the medical apparatus 300 is formed in the right panel 206 of the compartment 200.

In operation, the mobile care system 100 is driven to a desired location. The front billboard is moved to the opened position alongside the cab 110. The rear billboard is moved to the opened position to be substantially coplanar with the right-side panel and the front billboard. The side panel is raised to the opened position and the front section raised to display that mobile care is being administered. A lower panel is lowered to the opened position to form a floor and legs are put in place to support the floor. Staircases are also placed to allow patients to climb the stairs to the floor. The patient can then enter the patient room 250 and medical care can be rendered by the clinician in the clinician room 210 with the clinician and patient being isolated from transferring any diseases, viruses, or illnesses. The clinician further enters through the rear door 272 so that the clinician does not come into contact with the patient during ingress and egress to/from the medical care compartment 200. The patient can then leave and the next patient can approach the glass partition. At the end of the day, the panels can be closed and the mobile care system can leave the location.

Turning to FIGS. 6-9, additional embodiments of the disclosure are shown having two clinician rooms 410*a*, 410*b* and two patient rooms 450*a*, 450*b*. The layout is similar to FIGS. 1-5, except that an added dividing wall 413 with a door is located between the first clinician room 410*a* and the second clinician room 410*b*, an added medical care apparatus 300 is provided in the clinician dividing wall, and a patient dividing wall 416 is provided between the first patient area and the second patient area.

Accordingly, each medical care apparatus 300*a*, 300*b* includes a set of gloves 304, so that more than one set of gloves 304 are provided in the glass partition 302, and each set can be separated from each other by a partition wall 416 to define a first patient room 450*a* and a second patient room 450*b*; and/or an internal partition wall 413 to define a first clinician room 410*a*, 410*b*. The partition walls 413, 416 extends transversely and perpendicular to the dividing walls 414*a*, 414*b* and the longitudinal axis of the compartment 400.

In addition, each medical care apparatus 300*a*, 300*b* has a glass partition 302 in the respective dividing walls 414*a*, 414*b*. And each glass partition 302 can be separated by a partition wall 416 to define a first patient area 450*a* and a second patient area 450*b* that extends transversely and perpendicular to the clinician dividing wall 414. The partition wall 416 can extend from the ceiling to the floor and from the clinician dividing wall 414 to the right-side panel 206 of the compartment to essentially form separate patient rooms 450*a*, 450*b*.

Accordingly, the first clinician room 410*a* is defined by the left side panel 208, rear panel 204 a first clinician dividing wall 414*a* and a first interior dividing wall 413. The second clinician room 410*b* is defined by the left side panel 208, first interior dividing wall 413, second clinician dividing wall 414*b*, and the storage dividing wall 412. The first patient open room or area 450*a* is defined by the first clinician dividing wall 414*a*, rear panel 204, and the patient dividing wall 416. And, the second patient open room or area 450*b* is defined by the second clinician dividing wall 414*b*, storage dividing wall 412, and the patient dividing wall 416.

As best illustrated in FIGS. 2(*a*), 6(*a*), 6(*b*), an elevated platform 218, 418 is provided at the right side of the vehicle. The platform 218, 418 can be pivotally connected (such as by a hinge) to the right panel 206 of the compartment 200, 400, and can be moved between a stored vertical position and a horizontal operating position. In the stored position, the platform is raised to the vertical position and the side panel 226 is lowered to the vertical position over top of the platform 218, 418. In another embodiment, the platform can be removably connected to the compartment 200, 400, such as by locking clasps or the like. A first set of stairs is provided at the front side of the platform 218, 418, and a second set of stairs is provided at the rear side of the platform 218, 418. Railings can be provided at the right side of the platform 218, 418 to prevent a patient from inadvertently falling from the platform 218, 418. In other embodiments, only one set of stairs can be provided, or the stairs can be provided at the right side of the platform and railings at the front and rear sides of the platform 218, 418.

Figure 6A:
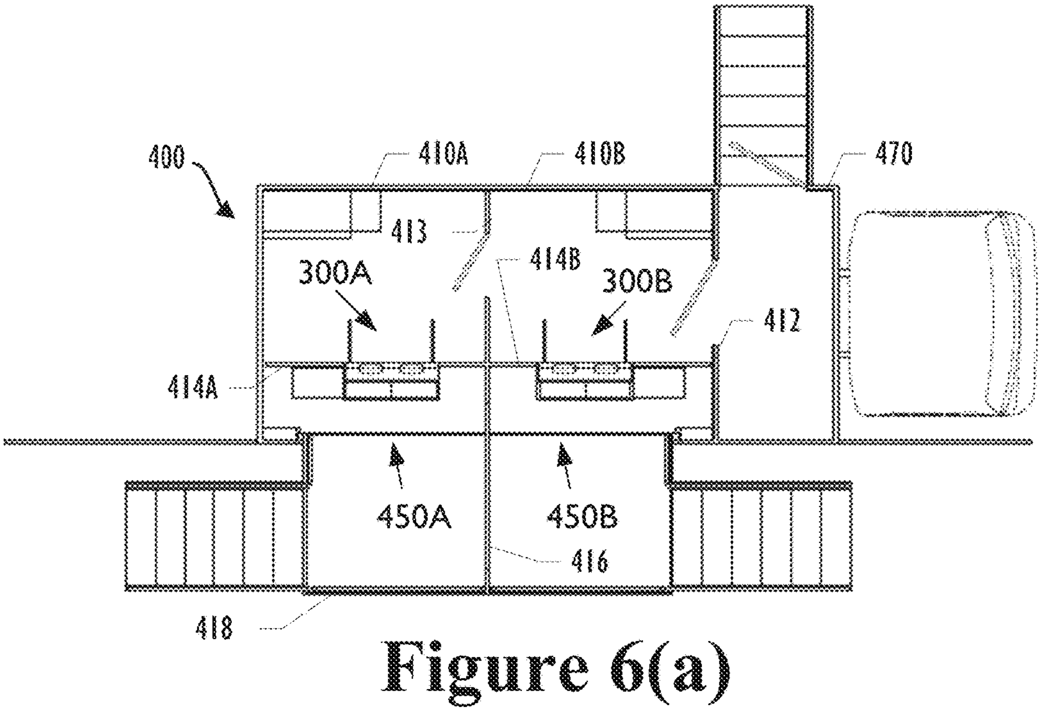
FIG. 6(*a*) is a top plan view of the mobile health vehicle with the top removed to show the multiple clinician rooms and multiple patient rooms each separated by a respective medical care apparatus.
Figure 6B:
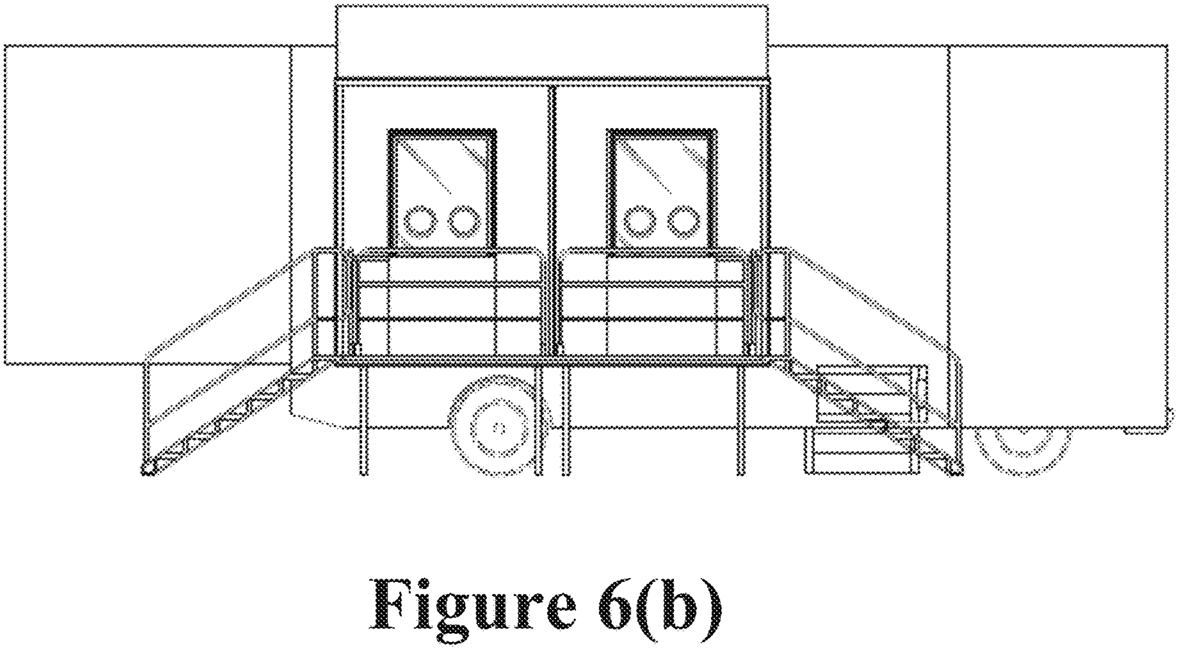

In FIGS. 6(*a*), 6(*b*), the first set of stairs at the rear of the platform 418 leads to the first patient area 450*a*, and the second set of stairs at the front of the platform 418 leads to the second patient area 450*b*. The dividing wall 416 extends all the way from the clinician dividing wall 414A, 414B to the railing, so that the patients do not come into contact with each other. if the stairs are located at the right side of the platform 418 (instead of the front and rear of the platform), the dividing wall 416 can extend down between the stairs.

The patient areas 450*a*, 450*b* can have an open right side so that patients can walk up the stairs into the respective patient area 450*a*, 450*b* and approach the respective medical care apparatus 300*a*, 300*b* without coming into contact with one another and without risk of exposure to or spread of an illness or disease, such as COVID.

Figure 7A:
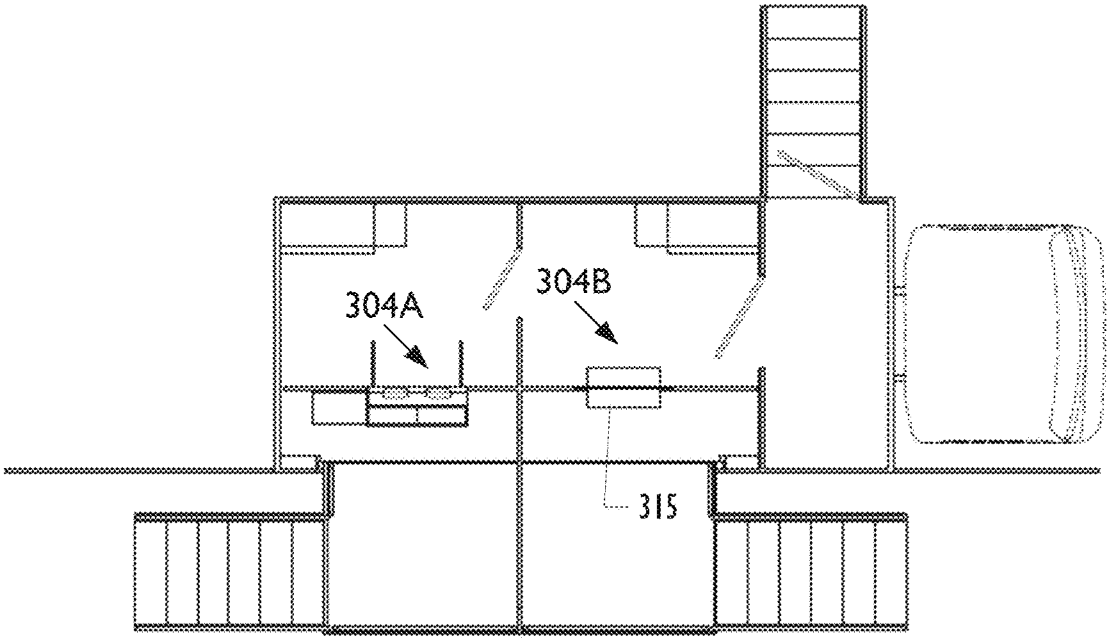
FIG. 7(*a*) is a top plan view of the mobile health vehicle with the top removed to show different medical care apparatuses separating two respective clinician rooms and patient rooms.
Figure 7B:
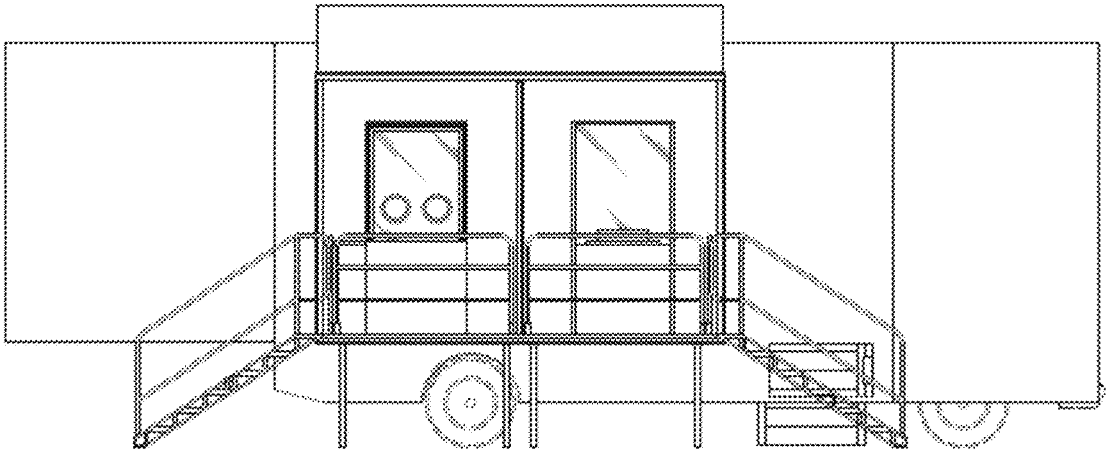

It is further noted that FIGS. 6(*a*), 6(*b*) show that the medical care apparatus 300*a*, 300*b* both have the same patient interaction device 304 (i.e., the glass partition and gloves). FIGS. 7(*a*), 7(*b*) show another embodiment, where the first medical care apparatus 300*a* associated with the first clinician room 410*a* and first patient area 450*a*, has a first patient interaction device 304*a*; and the second medical care apparatus 300*b* associated with the second clinician room 410*a* and second patient area 450*b*, has a second patient interaction device 304*b*. Here, the first patient interaction device 304*a* can be the glass partition with gloves and the second patient interaction device 304*b* can be a window that raises and lowers, such as a double-hung window.

A table 315 can also be provided at the patient area 450*a*, 450*b*, instead of a medical storage unit 310, that raises and lowers. A pass-through device can also be provided in the dividing wall or the glass partition 302 that allows products to be passed from the patient in the patient area to/from the clinician in the clinician room, such a testing devices, medicine, or the like. The pass-through device can prevent or reduce the transfer of any airborne illness or disease. A microphone and speaker can also be provided at each side of the dividing wall or partition 302 to allow the patient in the patient area to speak with the clinician m the clinician room. In yet another embodiment, the glass partition 302 can be removably attached to the medical care apparatus 300. Thus, glass partitions can be removed and exchanged. For example, one glass partition might have gloves and another glass partition might have a double-hung window so that the user can insert the glass partition that is bested suited to the particular medical application being made.

In other embodiments, more partitions 413, 416 can be provided to define more than clinician rooms and/or patient rooms can be provided, separated by internal dividing walls. In another embodiment, the movable right-side panel need not be provided, and instead external access doors can be provided in the right-side panel 206 of the compartment 200, 400. The patient can open the door to gain access to the patient room 250, 450, and where there are multiple patient rooms, each patient room 250, 450 can have its own external access door. In one embodiment, a generator and heating, ventilation and air conditioning system is provided so that the clinician room 210, 410 and/or patient room 250,450 can be temperature controlled, such as by heating and/or air conditioning. Ventilation for the clinician room 210, 410 and/or patient room 250, 450 can be configured to provide a positive pressure inside those rooms, so that any airborne viruses or the like are expelled out of the room.

Figure 8A:
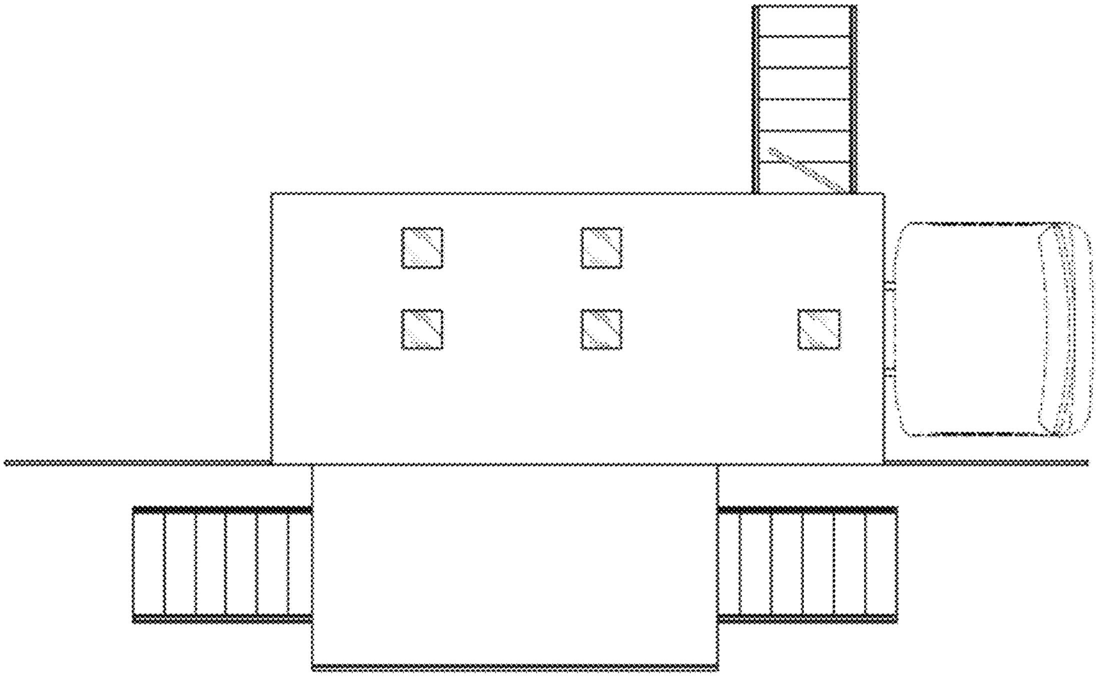
Figure 8B:
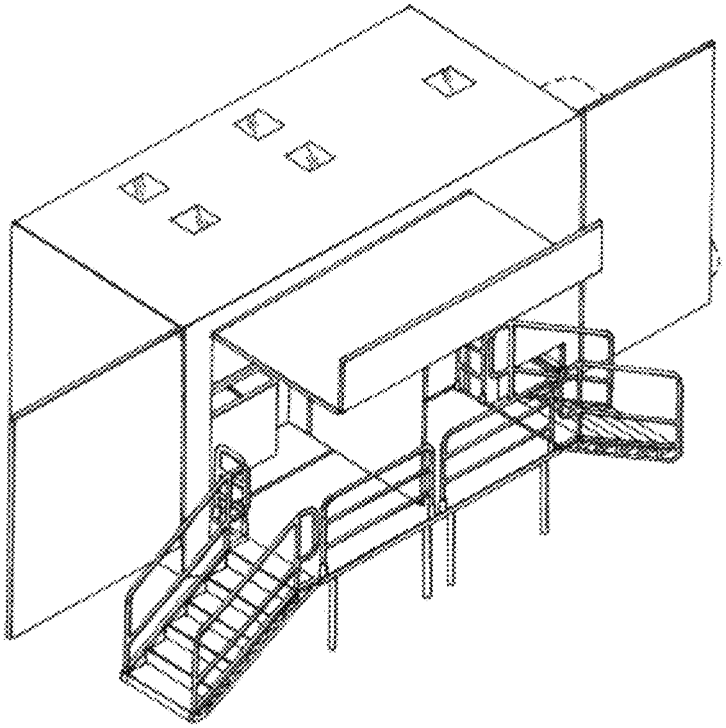

FIGS. 8(*a*), 8(*b*) show another feature of the disclosure, where one or more windows are provided in the ceiling of the compartment 200, 400. The ceiling windows allow sunlight to enter the compartment 200, 400. For example, one or more ceiling windows can be aligned with each of the patient rooms or areas and each of the clinician rooms, and the storage room.

Figure 9A:
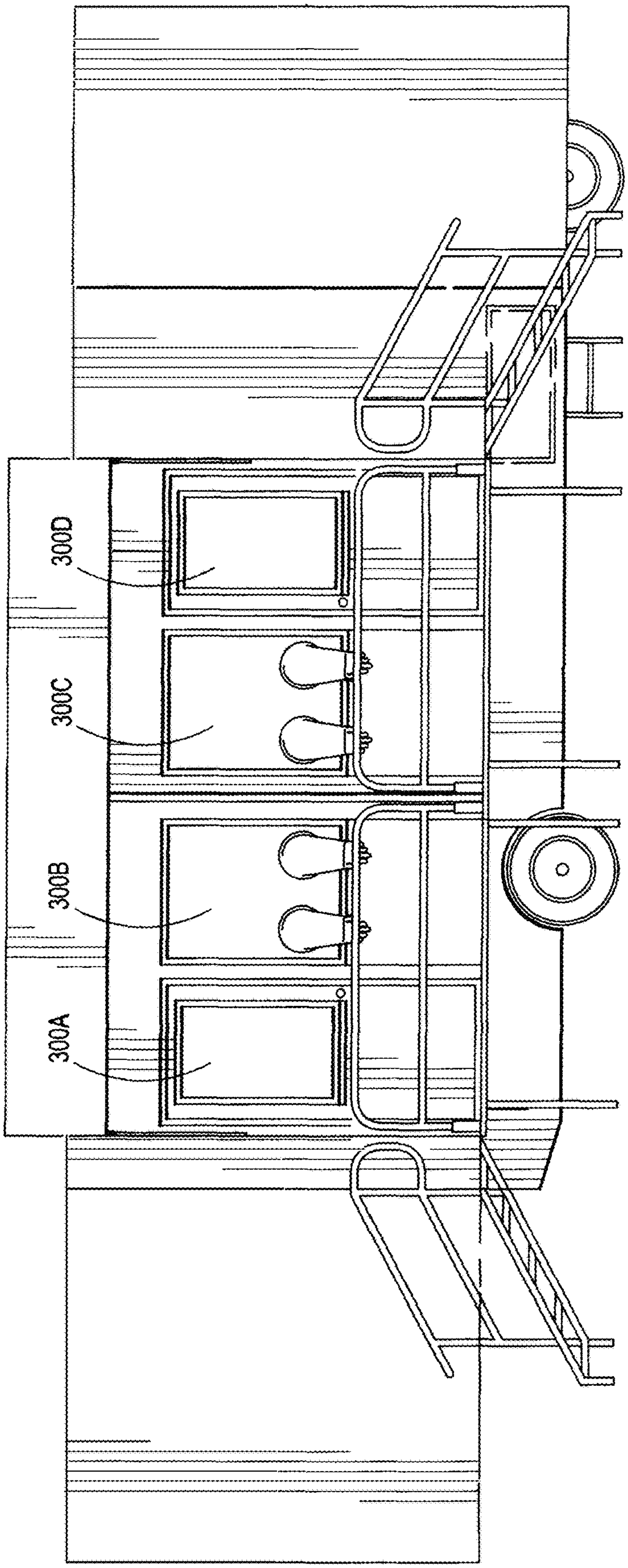
FIGS. 9(*a*, 9(*b*) is another illustrative embodiment of the mobile health vehicle.
Figure 9B:

FIGS. 9(*a*), 9(*b*) show yet another embodiment of the present disclosure. Here, more than one medical care apparatus is positioned at, located in, or associated with each of the clinician rooms and/or patient areas. As shown, a first and second medical care apparatus 300*a*, 300*b* are positioned at the first patient area or first clinician room, and a third and fourth medical care apparatus 300*c*, 300*d* are positioned at, located in, or associated with the second patient area or second clinician room. The first and fourth apparatuses 300*a*, 300*d* each have a double-hung window with a half-dome pass-through and a table that raises and lowers. The second and third apparatuses 300*b*, 300*c* each have gloves.

FIGS. 9(*a*), 9(*b*) further illustrates messaging on the front billboard 222, rear billboard 224 and the raised side panel 226. The platform can be supported by legs that are in the vertical operating position and can be removable or can fold under the platform 218 when the platform 218 is placed in the storage position. The stairs can be removably attached to the platform 218 or folded onto the platform 218 for storage as well.

As will be apparent, numerous variations of the compartment 200, 400 can be provided, for instance having a dividing wall 413 to create first and second clinician rooms, but no patient dividing wall 416 so that there is only a single patient area; a dividing wall 416 to create first and second patient areas, but no dividing wall 413 so that there is only a single clinician room; a patient dividing wall 416 that only extend partially outward from the clinician dividing wall 414 (see FIG. 9) so that patients can move on the platform 418 between the first patient area 450*a* to the second patient area 450*b*; a first and second medical care apparatus 300, both with gloves, both with sliding windows, or one with gloves and one with a sliding window, and one or more of which can be located in or associated with each patient area.

It is noted that the disclosure describes the clinician room and patient room being arranged longitudinally, such that the clinician room is at the left side of the compartment 200, 400 and the patient room or area is at the right side of the compartment 200, 400. It will be apparent that the rooms can be arranged in any suitable manner, for example transversely with one or more clinician rooms at the front or rear of the compartment 200, 400 and one or more patient rooms at the rear or front, respectively, of the compartment 200, 400 opposite the clinician room. Still further, for any of the above embodiments, the stairs and platform can be provided at the rear of the compartment instead of the right or left side, It is further noted that the drawings may illustrate and the description and claims may use several geometric or relational terms, such as planar, elongated, orthogonal, transverse, and longitudinally. In addition, the description and claims use several directional or positioning terms and the like, such as top, bottom, left, tight, inner, outer, side, front, and rear. Those terms are merely for convenience to facilitate the description based on the embodiments shown in the figures, and are not intended to limit the disclosure. Thus, it should be recognized that the disclosure can be described in other ways without those geometric, relational, directional or positioning terms. In addition, the geometric or relational terms may not be exact. For instance, walls or surfaces may not be exactly flat, perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the disclosure.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A medical care system comprising:
a first clinician room;
a second clinician room separate from the first clinician room;
a clinician non-movable dividing wall between the first clinician room and the second clinician room;
a first patient area separate from the first and second clinician rooms;
a first patient non-movable dividing wall between the first clinician room and the first patient area;
a first non-movable glass partition in the first patient dividing wall; and
one or more first gloves in the first glass partition;
a second patient area separate from the first patient area and the first and second clinician rooms;
a second patient non-movable dividing wall between the second clinician room and the second patient area;
a second glass non-movable partition in the second patient dividing wall;
one or more second gloves in the second glass partition; and
a third patient dividing wall between the first patient area and the second patient area.

2. The medical care system of claim 1, wherein said medical care system is mobile.

3. The medical care system of claim 1, wherein the first and second patient non-movable dividing walls, first and second non-movable glass partitions and said first and second one or more gloves form an airtight seal to isolate the first and second patient areas from the first and second clinician rooms, respectively, to prevent transmission of viruses or illnesses.

4. The medical care system of claim 3, wherein the first and second patient non-movable dividing walls, first and second non-movable glass partitions and said first and second one or more gloves provide an airtight seal to prevent the transmission of COVID-19 between the first and second clinician rooms and the first and second patient areas, respectively.

5. The medical care system of claim 1, further comprising a storage unit positioned in the first and second patient areas.

6. The medical care system of claim 5, further comprising a lid on the storage unit configured to open into the first and second patient areas and away from the first and second clinician room.

7. The medical care system of claim 6, further comprising a hinge pivotally connecting the lid to the storage unit, said hinge connected at a side of the lid and a side of the storage unit furthest from the first and second clinician rooms.

8. The medical care system of claim 1, further comprising a vehicle having a front end with a cab and a rear end having said medical care system.

9. A mobile medical care system comprising:
a cab;
a compartment behind the cab, said compartment having a fixed front panel, fixed rear panel, fixed left side panel, and fixed right side panel, said fixed front panel, fixed rear panel, fixed left side panel, and fixed right side panel defining an interior;
a clinician room located in the interior of said compartment;
a patient area separate from the clinician room;
a dividing wall between the clinician room and the patient room; and,
a medical care apparatus in the dividing wall, said medical care apparatus having a glass partition and accessible from an outside of said compartment.

10. The medical care system of claim 9, wherein said glass partition is removably attached to said medical care apparatus and can be replaced by a non-movable partition.

11. The medical care system of claim 10, wherein said glass partition comprises a sliding window or medical gloves.

12. The medical care system of claim 9, wherein the dividing wall and medical care apparatus form an airtight seal to isolate a patient in the patient room from a clinician in the clinician room to prevent transmission of viruses or illnesses.

13. The medical care system of claim 9, wherein the dividing wall and medical care apparatus provide an airtight seal to prevent the transmission of COVID-19 between the clinician room and the patient room.

14. The medical care system of claim 9, further comprising a storage unit positioned in the patient room.

15. The medical care system of claim 14, further comprising a lid on the storage unit configured to open into the patient room and away from the clinician room.

16. The medical care system of claim 15, further comprising a hinge pivotally connecting the lid to the storage unit, said hinge connected at a side of the lid and a side of the storage unit furthest from the clinician room.

17. The medical care system of claim 9, further comprising a vehicle having a front end with said cab and a rear end having said compartment.

18. The medical care system of claim 9, said right side panel having a panel opening and further comprising a movable panel movably coupled to said right side panel about the panel opening and movable between an open position that grants access to said medical care apparatus and a closed position that denies access to said medical care apparatus.

19. The medical care system of claim 9, further comprising an elevated platform adjacent the right side panel.

20. The medical care system of claim 1, further comprising a storage room separate from said first and second clinician rooms, and said first and second patient areas; said storage room having an external door providing access to an exterior of said medical care system, and a clinician door providing access to said first or second clinician rooms.

* * * * *